United States Patent [19]

Novejarque Conde

[11] Patent Number: 5,389,337
[45] Date of Patent: Feb. 14, 1995

[54] METHOD FOR PRODUCING A PRESERVATIVE FOR FOOD PRODUCTS

[75] Inventor: José A. Novejarque Conde, Valencia, Spain

[73] Assignee: Novesol, S.L., Valencia, Spain

[21] Appl. No.: 75,565

[22] PCT Filed: Oct. 18, 1991

[86] PCT No.: PCT/ES91/00068
§ 371 Date: Jun. 15, 1993
§ 102(e) Date: Jun. 15, 1993

[87] PCT Pub. No.: WO93/07768
PCT Pub. Date: Apr. 29, 1993

[51] Int. Cl.⁶ .............................. A61L 9/00; A23L 3/00
[52] U.S. Cl. ........................................ 422/29; 426/320
[58] Field of Search ................ 424/409; 426/133, 316, 426/320; 514/558, 724; 422/29

[56] References Cited

U.S. PATENT DOCUMENTS 3,908,031  9/1975  Wistreich et al. ............. 426/335
4,550,026  10/1985  Ando .............................. 426/313
5,126,109  6/1992  Saitoh ............................ 422/40

FOREIGN PATENT DOCUMENTS 60-184374  2/1986  Japan.
62-325228  10/1987  Japan.
1285179  11/1989  Japan.
2004602  1/1989  Spain.

*Primary Examiner*—Raymond J. Henley, Jr.
*Attorney, Agent, or Firm*—Richard M. Goldberg

[57] ABSTRACT

Method for producing a stabilizing, preserving and delaying product for foodstuff. It comprises the production by dissolution of salts of sodium, potassium, magnesium, lithium or of organic bases, and others of fatty acids of vegetable, animal or synthesis origin in hydroalcoholic solutions, at temperatures appropriate according to the melting point of the fatty acid used, so that solid products are obtained with a percentage of ethanol, varying between 30% and 90%, for producing an evaporation of its alcoholic contents till it substantially consumes out, with an average composition of pure ethanol of 87%; salt of sodium, potassium, magnesium, lithium or of organic (alkaline) bases such as trietanolamine, etc. in an amount of 7.8% and 4.4% of water, the evaporation being delayed by addition of fatty alcohols which form a crystalline network.

8 Claims, No Drawings

METHOD FOR PRODUCING A PRESERVATIVE FOR FOOD PRODUCTS

The aim of this invention is to obtain a product in solid state at room temperature that gives off ethanol vapour in an open recipient. This means that when it is placed in a sealed recipient and mixed with the air inside it reaches a concentration capable of inhibiting the growth of fungi, bacteria and mold.

The preservation systems and processes at present used or that have been used in the past for the preservation of food are the following:

Washing, filtering and centrifuging.

From the earliest times until the present day we have been using common salt, smoke, vinegar, oil, honey, dressing, sulphurous acid, borax, creosote, boric acid, sorbic acid, formic acid, salicylic acid, the salts of some of said acids authorized by different authorities, benzoic acid, formaldehyde, hydrogen peroxide, p-chlorobenzoic acid, esters of p-hydroxibenzoic acid, propionic acid, dehydroacetic acid, diethyl pyrocarbonate and the list of additives allowed by different authorities.

Pasteurization (HTST and LTH methods), Tyndallization, sterilization (ethylene oxide in autoclave), high temperature (100°) drying, low temperatures (refrigeration, slow freezing and fast freezing) UHT systems for milk, gases such as ozone, nitrogen protoxide and nitrogen, irradiation of the food in which we find UV rays $\beta$ rays $\delta$ rays, radappertization, radicidation and raduration, etc.

The creation of oxidizing or reducing atmospheres in order to obtain sterile atmospheres, now in a very early stage, will imply the use of reactives, that after reacting will produce the gases already mentioned, and leave as subproducts chemical residues, of a toxic nature in some cases and less toxic in others, but that would always be inadmissible for human consumption.

Ethanol is an alcohol that provides optimum conditions. The procedure already known of uses a silicon as a vehicle. As compared with this the procedure now being described obtains the ethanol from a vehicle that is made up of a fatty acid salt, and the advantage compared with silicon is that this can be manufactured and obtained in any part of the world at very similar economical prices.

The procedure used for obtaining a solid product at room temperature and which is capable of being liquified by heat at temperatures under 100° C. with an ethylic alcohol content not under 75% in weight, is undertaken according to the following process:

This comprises the obtaining by dissolution of salts of sodium, potassium, magnesium, lithium, or from organic bases such as triethanolamine, and others from fatty acids of vegetable origin, animal origin or synthesis in hydroalcoholic solutions, at suitable temperatures according to the melting point of the fatty acid used, in such a way as to be able to obtain solid products with a percentage of ethanol that varies between 30% and 90%, permitting the evaporation of their alcoholic content that extends practically to its elimination, with an average composition of pure ethanol of 87%; 7.8% sodium, potassium, magnesium, lithium or organic base (alkaline) salts such as triethanolamine, etc. and 4.4% water.

In order to be able to delay evaporation at will, quantities between 1% and 15% of fatty alcohols will be added to the mass previously obtained, using fatty alcohols such as: cetyl alcohol, lauric alcohol, myristic alcohol, palmitic alcohol, stearic alcohol, isooleic alcohol, linoleic alcohol, cerotic alcohol etc., giving rise to the formation of a crystalline mesh of said fatty alcohols to regulate the evaporation speed of the alcohol contained in their formulation, according to the nature, weight and volume of the food to be conserved, in this way enabling a food preserving, stabilizing and inhibiting agent to be obtained, that is suitable for each kind of food.

The product obtained by the aforementioned procedure does not affect the composition of the food, since the solid product that is the subject of this patent is packed in sachets, preferably made of hermetically sealed plastic film, to be placed inside the container with the food, after perforating the sachet and then proceeding to close and/or shrink wrap the final package in which the food is packed for its distribution and marketing, that becomes saturated with weak quantities of ethanol vapor, preserving the food until the pack is opened for consumption, when the tiny quantities of ethanol given off quickly disappear.

The dose for use varies from 0.35% to 1.4% of the food product to be preserved, in accordance with the value of its water activity.

I claim:

1. A method for producing a stabilizing and preserving solid product for foodstuffs such that the solid product has a percentage of ethanol of at least 75% by weight and can produce evaporation of an alcohol content thereof so as to effectively eliminate the alcohol content, comprising the steps of:

dissolving a salt and a fatty acid, in a hydroalcoholic solution, at temperatures selected according to the melting point of the fatty acid that is used; and adding quantities between 1% and 15% of fatty alcohols to form a crystalline mesh of said fatty alcohols so as to regulate the speed of evaporation of said alcohol content thereof, in accordance with the nature, weight and volume of the foodstuffs to be preserved.

2. A method according to claim 1, wherein said salt is selected from the group consisting of sodium, potassium, magnesium, lithium and organic base salts.

3. A method according to claim 2, wherein said organic base salt is an alkaline salt.

4. A method according to claim 3, wherein said alkaline salt is triethanolamine.

5. A method according to claim 1, wherein said fatty acid is selected from the group consisting of fatty acids of vegetable origin, fatty acids of animal origin and fatty acids by synthesis.

6. A method according to claim 1, wherein said solid product has an average composition of pure ethanol of approximately 87%, a material of approximately 7.8% selected from the group consisting of sodium, potassium, magnesium lithium and organic alkaline base salts, and approximately 4.4% of water.

7. A method according to claim 3, wherein said organic alkaline base salt is triethanolamine.

8. A method according to claim 1, wherein said fatty alcohols are selected from the group consisting of cetyl alcohol, lauric alcohol, isooleic alcohol, linoleic alcohol and cerotic alcohol.

* * * * *